United States Patent
Deleval

(10) Patent No.: US 11,091,225 B2
(45) Date of Patent: Aug. 17, 2021

(54) POWER TRAIN

(71) Applicant: E2 DRIVES SA, Genval (BE)

(72) Inventor: Arthur Deleval, Overijse (BE)

(73) Assignee: E2 DRIVES SA, Genval (BE)

( * ) Notice: Subject to any disclaimer, the term of this patent is extended or adjusted under 35 U.S.C. 154(b) by 0 days.

(21) Appl. No.: 16/962,616

(22) PCT Filed: Feb. 12, 2019

(86) PCT No.: PCT/EP2019/053386
§ 371 (c)(1),
(2) Date: Jul. 16, 2020

(87) PCT Pub. No.: WO2019/158503
PCT Pub. Date: Aug. 22, 2019

(65) Prior Publication Data
US 2020/0407016 A1   Dec. 31, 2020

(30) Foreign Application Priority Data
Feb. 16, 2018   (BE) .................................. 2018/5095

(51) Int. Cl.
*B62M 11/14* (2006.01)
*B62M 6/50* (2010.01)
*B62M 6/55* (2010.01)

(52) U.S. Cl.
CPC ............ *B62M 11/145* (2013.01); *B62M 6/50* (2013.01); *B62M 6/55* (2013.01)

(58) Field of Classification Search
CPC ..................... B62M 11/14–18; B62M 6/40–75
See application file for complete search history.

(56) References Cited

U.S. PATENT DOCUMENTS

| | | | | |
|---|---|---|---|---|
| 9,643,683 B2* | 5/2017 | Laprade | .................. | B62M 6/55 |
| 10,479,447 B2* | 11/2019 | Deleval | .................... | B62M 6/55 |
| 2017/0217537 A1* | 8/2017 | Yamamoto | ........... | B62M 11/145 |

FOREIGN PATENT DOCUMENTS

| | | |
|---|---|---|
| DE | 102010062534 A1 | 6/2012 |
| DE | 102017201325 A1 | 8/2017 |
| EP | 3188957 A1 | 7/2017 |
| WO | 2016034574 A1 | 3/2016 |

OTHER PUBLICATIONS

Written Opinion of the International Searching Authority dated Mar. 14, 2019, issued in corresponding International Application No. PCT/EP2019/053386, filed Feb. 12, 2019, 5 pages.

International Preliminary Report on Patentability dated Aug. 18, 2020, issued in corresponding International Application No. PCT/EP2019/053386, filed Feb. 12, 2019, 1 page.

International Search Report dated Mar. 14, 2019, issued in corresponding International Application No. PCT/EP2019/053386, filed Feb. 12, 2019, 5 pages.

\* cited by examiner

*Primary Examiner* — Erin D Bishop
(74) *Attorney, Agent, or Firm* — Christensen O'Connor Johnson Kindness PLLC

(57) ABSTRACT

A power train for a pedal vehicle includes a main output chainring and a secondary output chainring coupled to the crankset shaft by a first freewheel. The crankset shaft is coupled to the main output chainring via a deformable transmission element and an epicyclic gear.

17 Claims, 4 Drawing Sheets

POWER TRAIN

TECHNICAL AREA

The present invention concerns a power train for a pedal vehicle, in particular for a bicycle or electric bicycle.

BACKGROUND

The document WO2016/034574 describes a bicycle power train consisting of an epicyclic gear, a crankset shaft, an output chainring, a first motor and a second motor. The epicyclic gear consists of a ring gear, a sun gear and a planet carrier.

In this power train, the planet carrier includes dual planet gears, which is complex to manufacture, assemble and expensive.

SUMMARY OF THE INVENTION

One of the purposes of the invention is to provide a power train for a pedal vehicle that is simple to manufacture, light, robust, compact and particularly efficient.

To this end, the invention provides a power train for a pedal vehicle and comprising:
- a crankset shaft arranged to rotate about a first axis of rotation,
- a main output chainring arranged to drive an output transmission chain or belt,
- a first motor,
- a second motor,
- an epicyclic gear comprising a first input element, an output element and a sun gear,
- the crankset shaft and the second motor being connected to the epicyclic gear via the first input element so as to form a first input of the epicyclic gear,
- the first motor being connected to the epicyclic gear via the sun gear so as to form a second input of the epicyclic gear,
- the output element connecting the epicyclic gear to the main output chainring so as to form an output of the epicyclic gear,
characterized in that
- the main output chainring, the first input element, the output element and the sun gear are arranged to rotate about the same second axis of rotation different from the first axis of rotation,
- the main output chainring is integral with the output element, and
- the power train comprises:
- a secondary output chainring arranged to rotate about the first axis of rotation and meshed with the output transmission chain or belt,
- a first freewheel arranged to prevent the secondary output chainring from rotating slower than the crankset shaft when the crankset shaft rotates in the normal pedalling direction,
- a speed gear reduction system maintaining the direction of rotation for transmitting a rotation between the crankset shaft and the first input element.

In the power train according to the invention, the main output chainring, the first input element, the output element and the sun gear have an axis of rotation spatially offset from the axis of rotation of the shaft of the crankset. This allows the size of the sun gear to be independent of the diameter of the shaft of the crankset. This then makes it possible to install a sun gear with a smaller diameter and thus increase the ration of the epicyclic gear. It is therefore possible to obtain a sufficient ratio for the epicyclic gear without using double planet gears. This makes the power train easier to manufacture, easier to mount and cheaper.

The power train according to the invention also makes it possible to achieve a high reduction ratio between the first motor and the output chainring. Indeed, this reduction ratio depends on the ratio of the epicyclic gear, the gear reduction ratio between the crankset shaft and the first input of the epicyclic gear, and the ratio of the number of teeth between the secondary and main output chainrings.

The connection of the main output chainring to the output element allows the output of the epicyclic gear to drive the main output chainring without speed reduction. This allows particularly an easy assembly of the power train and makes it particularly light and compact. In addition, this results in particularly high efficiency.

The secondary output chainring, which rotates about a different axis than the main output chainring, guides the output transmission chain or belt about the shaft of the crankset to spread apart the lower and upper strands of the chain. Thus, this ensures that there is sufficient space between the strands of the transmission chain or belt to the rear wheel for the rear base of the vehicle frame to pass through. This rear base is the tube of the frame connecting the attachment point of the rear wheel to the mounting bracket of the centre motor. Preferably, the secondary output chainring is located outside a casing of the power train.

Since the shaft of the crankset is different from the shaft of the first input element, there is a first gear reduction between the crankset and the first input element. This reduces the torque in the epicyclic gear while increasing its rotational speed. As a result, the robustness requirements of the epicyclic gear are reduced and a lighter epicyclic gear is possible. In addition, the faster rotation of the components of the epicyclic gear makes it compatible with smaller motors, which typically rotate faster and with less torque than larger motors.

The first freewheel is designed to allow mechanical power transmission from the crankset shaft to the secondary output chainring. The first freewheel is arranged, preferably directly, between the crankset shaft and the secondary output chainring. In the locked position, the crankset shaft directly drives the secondary output chainring. In the free position, the secondary output chainring can rotate faster than the crankset shaft. This position of the freewheel allows a particularly low first gear ratio of the power train to be achieved.

In addition, the first freewheel allows, under certain conditions, the crankset shaft to directly drive the secondary output chainring, which in turn drives the output transmission chain or belt that drives the rear wheel. All pedalling power is then transmitted directly to the output transmission chain or belt via the secondary output chainring. The rest of the transmission system, including the epicyclic gear, is therefore unloaded, allowing for high mechanical efficiency. This occurs, for example, if the electrical system of the power train is switched off or if the power assist is disabled and the lowest gear ratio of the power train is selected.

The secondary output chainring can also transmit part of the power if the instantaneous torque on the crankset exceeds a certain threshold and the first motor is saturated at its maximum torque. For the duration of this pedal input, the instantaneous value of the gear ratio of the power train decreases, and for example, if the set gear ratio is low, the first freewheel may start to operate and drive the secondary output chainring, which then transmits the cyclist's excess torque to the output transmission chain or belt. When this happens, which can happen when the power assist is activated, the output transmission chain or belt receives power via the epicyclic gear and the main output chainring on the one hand and via the secondary output chainring on the other hand. The presence of the secondary output chainring and the first freewheel prevents the gear ratio of the power train from being less than one.

It is interesting to note that the power train has a mode of operation, which can be referred to as the "normal mode of operation", in which the entire power, which is the sum of the power of both motors and the cyclist's power, is supplied to the main output chainring. This main output chainring transmits the power via the output transmission chain or belt to the rear wheel. This mode of operation is the one most often used by cyclists using an electric bicycle.

In the power train according to the invention, a transmission by a speed gear reduction system maintaining the direction of rotation exists between the crankset shaft and the first input of the epicyclic gear. This speed gear reduction system allows a gear reduction of the angular velocity, which is particularly interesting because the speed of the crankset is much lower than that of an electric motor.

For the purpose of this document, the normal pedalling direction is the direction of rotation of the shaft of the crankset which corresponds to a forward movement of the pedal vehicle. Because of the couplings in the power train, the elements of the power train preferably each have a direction of rotation which corresponds to this normal pedalling direction.

The different characteristics of the power train according to the invention allow the elements thereof to have particularly large mechanical reduction/gear reduction ratios while keeping the number of transmission stages relatively small. Thus, the power train provides excellent efficiency while keeping the size and weight low.

A low number of transmission stages optimises transmission efficiency. In addition, it reduces the transmission clearance between the elements of the power train, which can improve the accuracy of the control of the power train. This control accuracy is in particular especially useful if the first motor is speed controlled based on the speed of the second motor.

An advantage of the power train is that it allows a gear reduction to be placed between the shaft of the crankset and the first input element of the epicyclic gear. This means that all the elements of the epicyclic gear rotate faster and with less torque. This reduces the mechanical stress on them.

Another advantage of the power train according to the invention is that it provides a continuously variable transmission ratio.

Preferably, the main and secondary output chainrings are directly or indirectly meshed with the transmission chain or belt that drives the rear wheel of the pedal vehicle. Any other mechanism for driving the output transmission chain or belt is nevertheless possible within the scope of the invention.

Preferably, the power train includes a control unit for controlling the first and second motors.

The fact that the shaft of the crankset and the secondary output chainring have the same axis of rotation means that the crankset shaft is not in the path of the output transmission chain or belt that connects the main output chainring to the rear wheel.

Preferably, the first axis of rotation and the second axis of rotation are parallel. Preferably, the axis of rotation of the second motor is also parallel to them.

For the purpose of this document, two connected or linked elements may be connected or linked directly or indirectly. They may, for example, be directly or indirectly meshed via at least one intermediate toothed wheel, belt and/or roller.

For the purposes of this document, the terms "input" and "output" should be understood to mean input and output in a kinematic chain. An input is preferably a mechanical power input and an output is preferably a mechanical power output.

For the purpose of this document, the ratio of the epicyclic gear is the reduction ratio of the epicyclic gear. In the case of an epicyclic gear with single planet gears, this is the ratio of the diameter of the ring gear to the diameter of the sun gear. The ratio for the epicyclic gear here is preferably between five and ten.

For the purpose of this document, a pedal vehicle can be a bicycle, moped, tricycle, for example.

For the purpose of this document, "the gear ratio of the power train" is defined as the ratio between the speed of the secondary output chainring and the speed of the shaft of the crankset. It may also be referred to as the "gear ratio parameter". It is a parameter that can be controlled manually by the cyclist via a control interface or calculated automatically by the control unit based on other parameters.

For the purposes of this document, an element "arranged to rotate about an axis of rotation" is preferably an element that is essentially symmetrical about that axis.

For the purpose of this document, a "fixed ratio" between two objects means that their rotational speeds are in a constant ratio.

For the purposes of this document, the "assistance level of the power train" means the portion of power given by the electrical assistance relative to the power given by the cyclist. It can be calculated as the power of the combination of the two motors divided by the sum of the power of the combination of the two motors and the cyclist's power. It can also be referred to as the "assistance level parameter". It is a parameter that can be controlled manually by the cyclist via a control interface or calculated automatically by the control unit based on other parameters.

For the purpose of this document, an angular position measurement is equivalent to an angular velocity measurement. Indeed, the power train according to the invention preferably comprises a means for determining the angular velocity of one of the motors from the angular position of this motor.

For the purposes of this document, a current measurement is equivalent to a torque measurement. Indeed, the power train according to the invention preferably comprises a means for determining the torque of one of the motors from the current supplied to this motor.

The epicyclic gear comprises a ring gear, a planet carrier and a sun gear. The planet carrier includes planet gears. The sun gear can also be called the inner sun gear or sun. The ring gear can also be called the outer sun gear. The sun gear and the ring gear are preferably connected via the satellites.

Preferably, the planet carrier comprises simple planet gears only. Indeed, the power train according to the invention avoids the use of double planet gears.

Preferably, the power train comprises one or more batteries.

Preferably, the main output chainring is fixed to a hollow shaft arranged around the axis of the first motor and coaxial to the epicyclic gear.

Preferably, the secondary output chainring is attached to a hollow shaft arranged around the crankset shaft and coaxial to the shaft of the crankset.

The main output chainring could be referred to as the "first output chainring" and the secondary output chainring could be referred to as the "second output chainring".

The transmission between the shaft of the crankset and the first input element is via a transmission mechanism such that the first input element rotates in the same direction as the crankset shaft.

Preferably, the main output chainring and the secondary output chainring are connected to the rear wheel of the pedal vehicle via an output transmission chain or output transmission belt.

The rotation of the shaft of the crankset is caused by the pedalling motion of a cyclist using the pedal vehicle. The use of an epicyclic gear taking as an input the shaft of the crankset allows a change in the gear ratio between the rotation of the crankset shaft and the rotation of the main output chainring, as well as the rotation of the secondary output chainring.

Preferably, the control of the motors is a feedback control, also called closed-loop control.

The power train according to the invention can be operated as a back-pedal brake, which allows to recover the braking energy to recharge the battery. Preferably, the power train is then arranged so that the rear wheel is capable of driving the chain to transmit the motion to the main output chainring. This can be done, for example, by installing the pinion of the rear wheel in a fixed position on a hub of the rear wheel. Therefore, if the pedal vehicle is descending a slope, the chain spins while driving the main output chainring. This will cause the first motor and/or the crankset to rotate in a direction that corresponds to the normal pedalling direction. If the cyclist wishes to brake, he can operate the crankset backwards, i.e. in the opposite direction to the normal pedalling direction. The position of the crankset can be determined by the measuring element of an angular position of the second motor, e.g. by means of the second sensor. Preferably, the second motor is then not controlled by the control unit. Preferably, the first motor is torque or current controlled, with a negative torque setpoint corresponding to the fact that the motor acts as a generator. This negative torque setpoint is preferably proportional to a negative angle made by the crankset. The measurement of this angle is set to zero at the moment when the cyclist operates the crankset backwards. Thus, the moment the cyclist moves the crankset backwards, the first motor begins to brake the bicycle. The cyclist feels a torque proportional to the braking torque of the first motor, tending to move the crankset forward. It is therefore a stable system. The more the cyclist pushes backwards, the more the first motor brakes. If the cyclist releases the rearward pressure on the crankset, the crankset will move forward and the first motor will stop braking the bike. If the main output chainring is connected to the planet carrier, the latter acts as a differential. It therefore tends to make the first motor turn in a direction that corresponds to the normal pedalling direction. The first motor is then controlled like a generator to brake the bike and thus transmit power to the battery. This system can for example be activated by a back-pedal, like the torpedo system. The power of the brake and thus the amount of energy supplied to the battery can be controlled according to the back-pedalling force exerted by the cyclist.

In a first embodiment of the invention, the first input element is a ring gear of the epicyclic gear and the output element is a planet carrier of the epicyclic gear.

According to a preferred example of this embodiment, the shaft of the crankset is connected with a fixed ratio to the ring gear; the rotor of the second motor is connected with a fixed ratio to the ring gear; the rotor of the first motor is connected with a fixed ratio to the sun gear; the ring gear forms the first input of the epicyclic gear and the sun gear forms the second input of the epicyclic gear; the planet carrier forms an output of the epicyclic gear; the planet carder is integral with the main output chainring. More preferably, the rotor of the first motor is integral with the sun gear.

In a second embodiment of the invention, the first input element is a planet carrier of the epicyclic gear and the output element is a ring gear of the epicyclic gear.

According to a preferred example of this embodiment, the crankset shaft is connected with a fixed ratio to the planet carrier; the rotor of the second motor is connected with a fixed ratio to the planet carrier; the rotor of the first motor is connected with a fixed ratio to the sun gear; the planet carrier and the sun gear form two inputs of the epicyclic gear; the ring gear forms an output of the epicyclic gear, the ring gear is connected with a fixed ratio to the main output chainring. More preferably, the rotor of the first motor is integral with the sun gear.

In an embodiment of the invention, the speed gear reduction system maintaining the direction of rotation comprises a deformable transmission element, for example a chain or belt.

For the purposes of this document, a deformable transmission element may be, for example, a flexible belt. It may be a belt, preferably made of a flexible material and preferably toothed or notched on its inner surface. It can also be a chain.

The use of a deformable transmission element also makes it possible to reduce the tolerance margins, i.e. the clearance, in the transmission compared to the use of gears.

Preferably, the speed gear reduction system retaining the direction of rotation is a deformable transmission element, a double gear stage or a gear where one of the gears has an internal toothing because in each of these transmission systems the direction of rotation of the input is identical to the direction of rotation of the output.

In contrast to the gear transmission, the transmission by means of a deformable transmission element leaves the choice of the centre distance between the rotating elements at both ends. This gives a lot of design freedom. It also makes it possible to achieve a large gear reduction ratio between the crankset shaft and the first input of the epicyclic gear without increasing the size of the system. This high gear reduction ratio allows a relatively small diameter crankset shaft to be selected, which reduces the weight of the power train. It also reduces the size of the electric motors. This increases the gear reduction ratio between the shaft of the crankset and the first input element without increasing the size of the power train.

In addition, the use of a deformable transmission element to reduce the speed of the shaft of the crankset up to the first input of the epicyclic gear results in a particularly large distance between the crankset shaft and the axis of the epicyclic gear. This makes it possible to increase the size of the ring gear of the epicyclic gear to increase its ratio. The purpose of increasing the ratio of the epicyclic gear is to increase the speed of both electric motors and thus reduce the size of these motors. This reduces the weight and the volume of the power train. In this way, it is possible to reduce the diameter of the two electric motors, allowing both to be positioned on the same side of the power train.

The deformable transmission element isolates the crankset from vibrations which may be caused by the electric motors or the transmission. This dampens the vibrations felt by the cyclist's feet, thus improving comfort.

In an embodiment of the invention, the second motor is connected to the first input element of the epicyclic gear by a single-stage reduction mechanism. For example, the rotor of the second motor can be directly meshed with the first input element. This limits losses and gear clearance.

In one embodiment of the invention, the first motor is integral with the sun gear.

In one embodiment of the invention, the first motor and the second motor are located on the same side of the epicyclic gear. This design makes it possible to reduce the volume of the power train and to facilitate assembly because the two motors are thus close to the same electronic board to which they can both be connected. Preferably, the motors are located on the opposite side of the power train from the output chainrings.

In an embodiment of the invention, the power train further comprises:
 an angular position measuring element of the first motor,
 an angular position measuring element of the second motor,
 a current measuring element of the first motor,
 a current measuring element of the second motor,
 a control unit connected to the first motor, the second motor, and arranged to control the first motor and the second motor based on the angular position of the first motor, the angular position of the second motor, the current of the first motor and the current of the second motor, the control unit being arranged to control the second motor according to current or torque control and to control the first motor according to an angular position or angular velocity control.

In an embodiment of the invention, the role of the first motor is to control the gear ratio of the power train. One of its functions is to provide a given transmission ratio. This transmission ratio is the ratio between the angular velocity of the shaft of the crankset and the angular velocity of the secondary output chainring. This transmission ratio can for example be determined based on a gear ratio parameter provided by the user of the pedal vehicle or determined by the control unit in order to offer an automatic gear change to the cyclist. This determination can in particular be carried out by a gear shifting algorithm. The first motor is preferably controlled in angular position or angular velocity, for example via the control unit which controls the first motor in such a way that an angular position or angular velocity setpoint is respected.

In an embodiment of the invention, the role of the second motor is to manage the correct level of assistance of the power train. One of its functions is to assist the cyclist's movement by adding torque to the crankset. Preferably, the level of assistance is determined by the control unit on the basis of, among other things, an assistance level parameter. The assistance level parameter can be determined by the user or automatically by the control unit of the powertrain. It is preferred that the assistance level is independent of the power train gear ratio. The second motor is preferably controlled in current or torque, e.g. via the control unit which controls the second motor so that a current or torque setpoint is met.

Preferably, the control unit is electrically connected to the measuring element of an angular position of the first motor, the measuring element of an angular position of the second motor, the measuring element of a current of the first motor, and the measuring element of a current of the second motor.

It is interesting to note that there is no fundamental difference between position control and speed control because there is a direct mathematical relationship between the two values. Angular velocity is the time derivative of angular position. For example, controlling a motor to run at a constant angular velocity is like controlling a motor to follow an angular position that changes linearly with time.

For example, controlling the first and second motors can be done as follows in the first embodiment.

The angular velocity of the rear wheel of the bicycle $\omega_R$ is proportional to the angular velocity of the secondary output chainring $\omega_{plat}$:

$$\omega_R R_R \cdot \omega_{plat}$$

With $R_R$ the transmission ratio between the angular velocity of the rear wheel of the bicycle and the angular velocity of the secondary output chainring.

The angular velocity of the secondary output chainring is given by $$\omega_{plat} = \frac{1}{R_{out}}\left(\frac{\omega_{M1} + R.R_C.\omega_{ped}}{R+1}\right)$$

Where $R_{out}$ is the ratio of the number of teeth between the secondary output chainring and the main output chainring, $R_C$ is the gear reduction ratio between the crankset shaft and the ring gear, $\omega_{M1}$ is the angular velocity of the first motor, $\omega_{ped}$ is the angular velocity of the crankset and R is the ratio for the epicyclic gear.

The crankset angular velocity can be determined from the measured angular velocity of the second motor $\omega_{M2}^{mes}$ by $$\omega_{ped} = \frac{\omega_{M2}^{mes}}{R_{M2}.R_C}$$

Where $R_{M2}$ is the reduction ratio between the second motor and the ring gear. $R_{M2}$ is preferably between 5 and 15.

The control unit uses a gear ratio parameter GC (Gear Coefficient) and the measured angular velocity of the second motor $\omega_{M2}^{mes}$ to determine the angular velocity setpoint imposed on the first motor $\omega_{M1}^{cons}$ $$\omega_{M1}^{cons} = GC.\omega_{ped}.R_C = GC.\frac{\omega_{M2}^{mes}}{R_{M2}}$$

so that the angular velocity of the rear wheel is proportional to the angular velocity of the crankset when the GC parameter is constant. By combining the equations, we obtain:

$$\omega_R = \frac{R_R.R_C}{R_{out}}\left(\frac{GC+R}{R+1}\right).\omega_{ped}$$

$\omega_{M1}^{cons}$ is therefore an angular velocity setpoint imposed on the first motor. In the same way, it is possible to control the first motor in position by assigning a position setpoint to it that is simply the integral of this speed setpoint $\omega_{M1}^{cons}$.

The torque equation for the epicyclic gear gives us this expression:

$$C_{M1} = \frac{C_{cour}}{R} = \frac{C_{PS}}{(R+1)}$$

Where $C_{M1}$ is the torque of the first motor, $C_{cour}$ is the torque of the ring gear and $C_{PS}$ is the torque of the planet carrier.

Knowing that the torque of the crankset and the torque of the second motor are added at the ring gear, we are able to calculate the torque of the crankset $C_{ped}$ from the torque measured on the first motor $C_{M1}$ and the torque measured on the second motor $C_{M2}$.

$$C_{ped} = R_c \cdot (C_{M1} \cdot R - C_{M2} \cdot R_{M2})$$

This eliminates the need for a torque sensor as is the case with most pedal vehicle power trains.

A parameter for the level of AF (Assistance Factor) assistance can be considered, for example, equal to the ratio of the power supplied by the electric motors to the total power supplied to the main output chainring $$AF = \frac{P_{M1} + P_{M2}}{P_{M1} + P_{M2} + P_{human}}$$

Taking into account that the power is equal to the torque multiplied by the angular velocity, it is possible to determine the torque of the second motor that is adequate to reach the desired assistance level parameter, based on the torque of the first motor $C_{M1}$, by the equation $$AF = \frac{GC + \frac{R_{M2} \cdot C_{M2}}{C_{M1}}}{GC + R} \Rightarrow C_{M2}^{cons} = \frac{C_{M1}^{mes} \cdot (AF(GC + R) - GC)}{R_{M2}}$$

$C_{M2}^{cons}$ is therefore a torque or current setpoint imposed on the second motor.

The speed control of the first motor, as described above, is very sensitive to transmission clearance. Indeed, the synchronization of the sun gear with the first input of the epicyclic gear is done via a certain multiplying coefficient proportional to the gear ratio of the power train. The instantaneous angular position of the sun gear is known via the angular position sensor of the first motor. The angular position of the first input of the epicyclic gear is derived from the angular position read by the angular position sensor of the second motor. It is therefore preferable to limit the transmission clearance between the second motor and the first input of the epicyclic gear. It is therefore preferable to have only one reduction stage between the second motor and the first input of the epicyclic gear in order to reduce the transmission clearance. Similarly, the position of the first input of the epicyclic gear set is influenced by the transmission clearance between the first input and the shaft of the crankset. It is interesting to note that the use of a deformable transmission element, such as a toothed belt, also greatly reduces the transmission clearance.

In an embodiment of the invention, the control unit is arranged to determine a current or torque setpoint and to impose said current or torque setpoint on the second motor, the current or torque setpoint being determined as directly proportional to the torque or current of the first motor obtained by the current measuring element of the first motor and being dependent on the power train gear ratio parameter (GC) and the assist level parameter (AF) of the power train.

In an embodiment of the invention, the crankset shaft and the first input element are connected so that the first input element rotates faster than the crankset shaft. This allows a gear reduction. Thus the epicyclic gear is subject to little mechanical stress because the torque is lower. In addition, this increases the rotational speed of the elements of the epicyclic gear, which makes it possible to use electric motors that rotate faster and are therefore smaller in size.

In one embodiment of the invention, the main output chainring has a smaller diameter than the secondary output chainring. The secondary output chainring may, for example, have a diameter between 1.5 and 3 times larger than the diameter of the main output chainring.

In an embodiment of the invention, the second motor is connected to the first input element so that the first input element rotates slower than a rotor of the second motor. This makes it possible to decrease the torque and increase the rotational speed of the rotor of the second motor and thus to miniaturize the size of the second motor.

In an embodiment of the invention, the power train further comprises a printed circuit board and the measuring element of an angular position of the first motor comprises a first sensor, the measuring element of an angular position of the second motor comprises a second sensor, the first sensor and the second sensor preferably being arranged on the printed circuit board. The printed circuit board is preferably flat.

In an embodiment of the invention, the power train further comprises a second freewheel arranged to prevent the second motor from driving the crankset shaft in a rotational direction corresponding to a forward movement of the pedal vehicle.

The invention further provides a pedal vehicle comprising:
 a power train according to one of the embodiments of the invention,
 a wheel, and
 an output transmission chain or belt meshed with the main output chainring, the secondary output chainring and a pinion of the wheel.

This wheel is preferably a rear wheel of the pedal vehicle. In addition, the pedal vehicle may comprise a tensioning roller engaged with the output transmission chain or belt to improve the tension in the output drive chain or belt.

BRIEF DESCRIPTION OF FIGURES

Other characteristics and advantages of the invention will appear when reading the following detailed description, for the understanding of which reference should be made to the annexed figures, among which.

and

Figure 4:
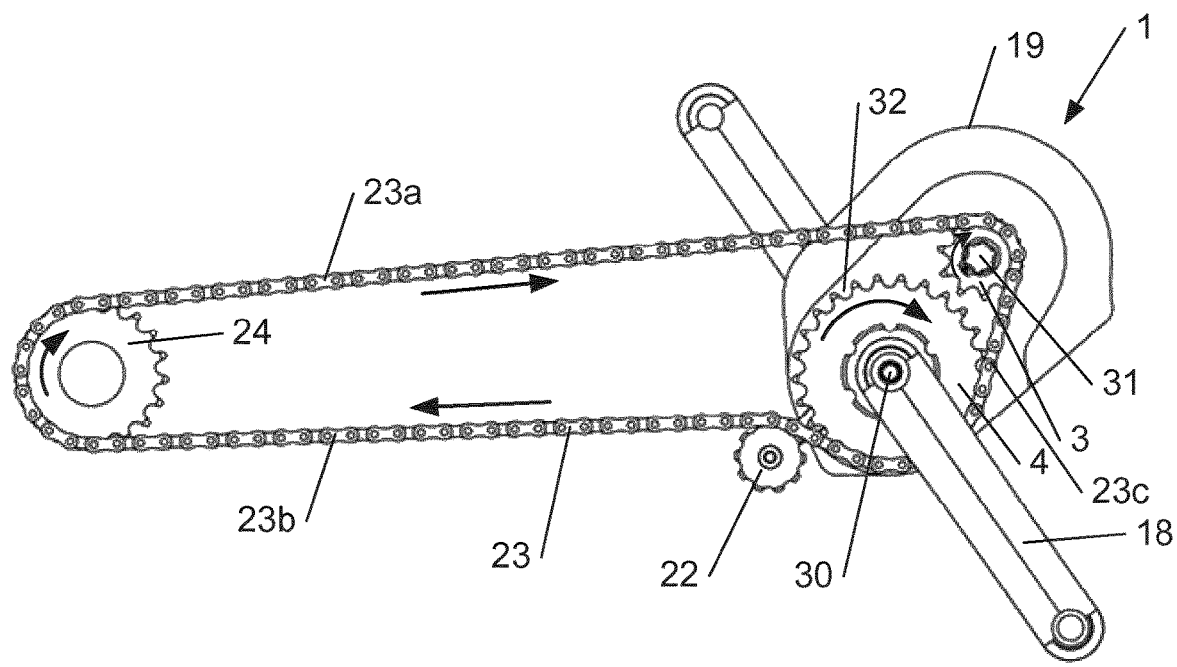

FIG. 4 shows a side view of the power train according to an embodiment of the invention and transmission to a rear wheel of the pedal vehicle.

EMBODIMENTS OF THE INVENTION

The present invention is described with particular embodiments and references to figures, but the invention is not limited by them. The drawings or figures described are only schematic and are not limiting.

For the purpose of this document, the terms "first" and "second" serve only to differentiate between the different elements and do not imply any order between them.

In figures, the identical or similar elements may bear the same references.

Figure 1:
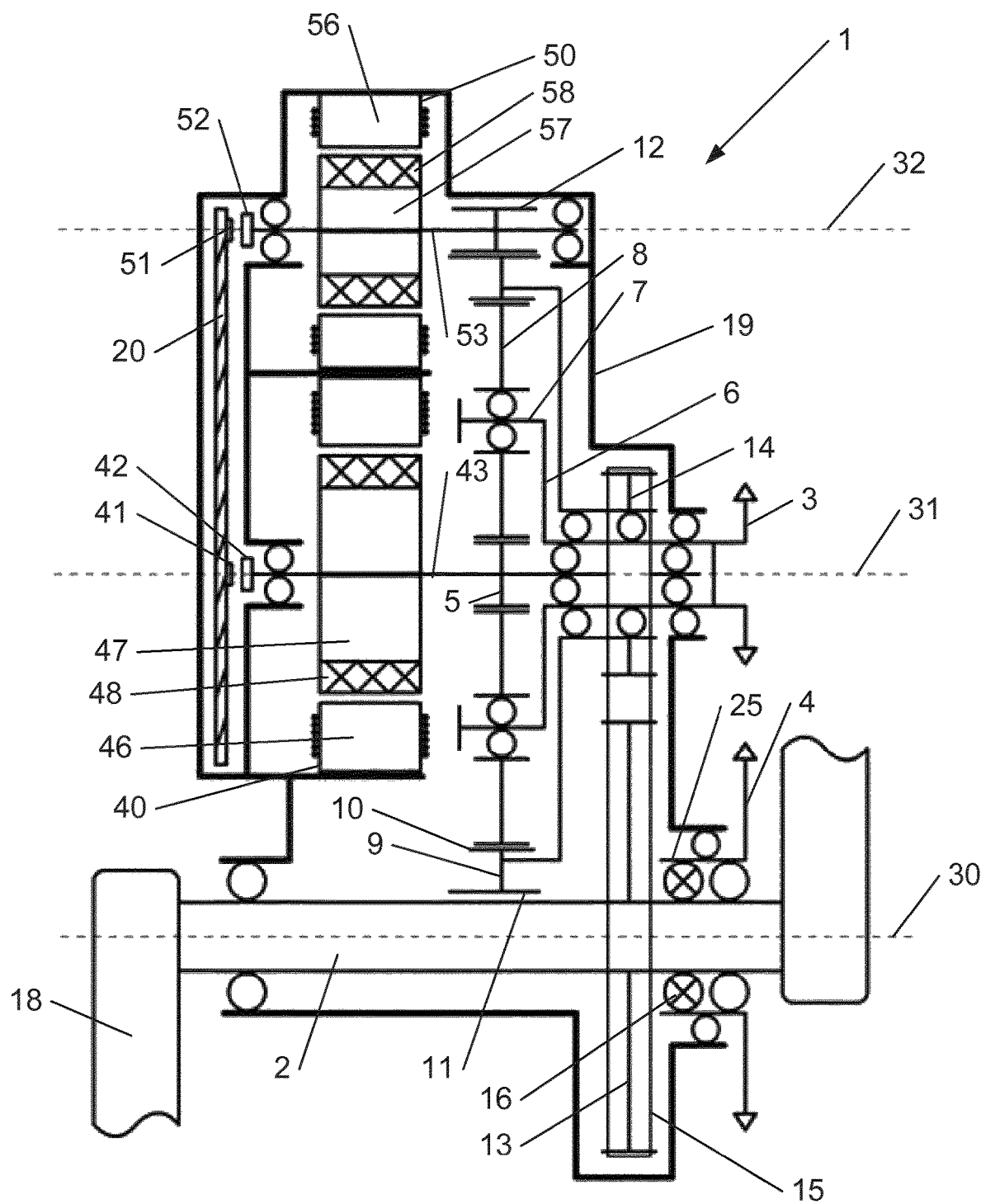
FIG. 1 illustrates a schematic section of a first variant of the first embodiment of the invention.

FIG. 1 illustrates a schematic section of a first variant of the first embodiment of the invention.

The power train 1 comprises a crankset shaft 2 and a secondary output chainring 4 with the same axis of rotation. This axis may be called first axis of rotation 30. Preferably, the crankset shaft 2 is attached to two cranks 18. Preferably, the power train 1 shall comprise a casing 19.

The power train 1 comprises a main output chainring 3 attached to the planet carrier 6, preferably at one end of the planet carrier 6, so as to rotate with the planet carrier 6.

The power train 1 also includes a secondary output chainring 4 attached to a secondary output hollow shaft 25 passing through the side wall of the casing 19. The secondary output hollow shaft 25 is mounted in bearings around the crankset shaft 2. A first freewheel 16 shah be installed between the crankset shaft 2 and the secondary output hollow shaft 25 in such a way that the secondary output chainring 4 cannot rotate at a lower speed than the crankset shaft 2 when the crankset shaft 2 is actuated in the normal pedalling direction.

The power train 1 comprises a first motor 40 and a second motor 50. The first motor 40 comprises a stator 46 and a rotor 47 which preferably comprises magnets 48. The rotor 47 is arranged to rotate about a second axis of rotation 31. The torque of rotor 47 is transmitted via the shaft of the rotor 43 to a sun gear 5. The second motor 50 comprises a stator 55 and a rotor 57 which preferably comprises magnets 58. The rotor 57 is arranged to rotate about a third axis of rotation 32. The rotor 57 of the torque is transmitted via the shaft of the rotor 53 to a pinion 12.

A function of the first freewheel 16 is to allow purely mechanical power transmission from the crankset shaft 2 to the transmission chain 23, even if the motors 40, 50 are not powered. In the locked position, the freewheel 16 makes the crankset shaft 2 integral with the secondary output chainring 4, and in the free position, the output chainring 4 is free to rotate faster than the crankset shaft 2 when the crankset shaft 2 is actuated in the normal pedalling direction.

The power train 1 preferably comprises a current measuring element of the first motor 40 and a current measuring element of the second motor 50.

The power train 1 furthermore preferably comprises a control unit, preferably attached to a printed circuit board 20. The printed circuit board 20 preferably being located perpendicular to the second 31 and third 32 axes of rotation.

Preferably, a first measuring magnet 42 is attached to one end of a shaft 43 of the first motor 40 and a second measuring magnet 52 is attached to one end of a shaft 53 of the second motor 50.

Preferably, a first sensor 41 is attached to the printed circuit board 20, approximately in line with the second axis of rotation 31. The first sensor 41 and the first measuring magnet 42 are part of an angular position measuring element of the rotor 47 of the first motor 40.

Preferably, a second sensor 51 is attached to the printed circuit board 20, approximately in the axis of the third axis of rotation 32. The second sensor 51 and the second measuring magnet 52 are part of an angular position measuring element of the rotor 57 of the second motor 50.

The control unit controls the first motor 40 and the second motor 50 on the basis of the angular position of the first motor 40, the angular position of the second motor 50, the current of the first motor 40 and the current of the second motor 50, these information has been supplied to it by the measuring elements.

The control unit controls the second motor 50 in current or torque. The control unit controls the first motor 40 in angular position or angular velocity.

The power train 1 comprises an epicyclic gear comprising a first input element, an output element and the sun gear 5.

The power train 1 further comprises a deformable transmission element 15, e.g. a chain or belt, for transmitting rotation between the crankset shaft 2 and the first input element. This deformable transmission element 15 forms a speed gear reduction system maintaining the direction of rotation.

Figure 2:
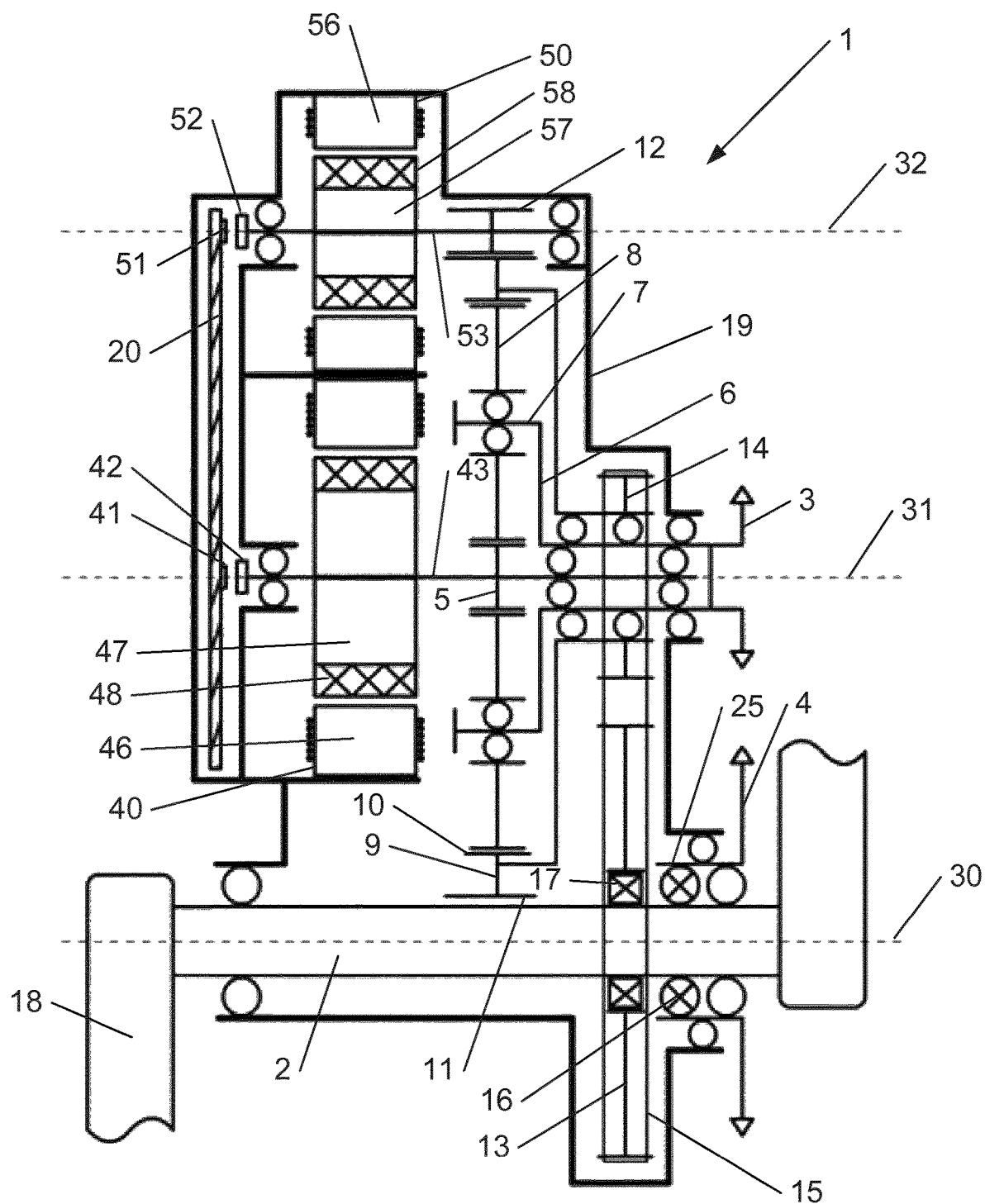
FIG. 2 illustrates a schematic section of a second variant of the first embodiment of the invention.

In the first embodiment of the invention, which is that illustrated in FIGS. 1 and 2, the first input element is a ring gear 9 and the output element is a planet carrier 6. Preferably, the planet carrier 6 comprises at least one satellite 8 arranged to rotate about a planet gear shaft 7. Preferably, the ring gear 9 is meshed with at least one planet gear 8 via its internal toothing 10. Preferably, the sun gear 5 is meshed with at least one planet gear 8.

In an embodiment of the invention, a first gearwheel 13 is integral with the crankset shaft 2. The first toothed wheel 13 is connected to a second toothed wheel 14 by the deformable transmission element 15. The second toothed wheel 14 is integral with the ring gear 9. Preferably, the first toothed wheel 13 has a larger diameter than the second toothed wheel 14 in order to increase the rotational speed with respect to that of the crankset shaft 2. For example, the diameter of the first toothed wheel 13 can be between 1.5 and 3 times larger than that of the second toothed wheel 14.

In normal operation mode, the power train 1 according to the first embodiment of the invention functions as follows. The crankset shaft 2 and the second motor 50 drive the ring gear 9, the drive between the crankset shaft 2 and the ring gear 9 passing through the deformable transmission element 15. The ring gear 9 is a first input of the epicyclic gear. The first motor 40 drives the sun gear 5, which is a second input of the epicyclic gear. The ring gear 9 and the sun gear 5 drive the planet carrier 6, which is an output of the epicyclic gear. The planet carrier 6 drives the main output chainring 3. The rotational speed of the main output chainring will be equal to a weighted sum of the rotational speed of the ring gear 9 and the rotational speed of the sun gear 5. By increasing the rotational speed of the sun gear 5, it is therefore possible to increase the speed of the main output chainring 3, keeping a constant rotational speed at the crankset shaft 2. Therefore, it is a continuously variable transmission (CVT).

The pinion 12 is connected to the rotor 57 of the second motor 50 so that it rotates with this rotor 57. The pinion 12 is directly meshed with an external toothing 11 of the ring gear 9. The pinion 12 has a smaller diameter than the ring gear 9, the purpose being to reduce the rotational speed compared to that of the motor.

The sun gear 5 is connected to the rotor 47 of the first motor 40 in such a way that it rotates with this rotor 47.

The planet carrier 6 passes through the side wall of the casing 19 so that the main output chainring 3, which is attached to the planetary carrier 6, is located outside of the casing 19.

The first freewheel 16 prevents the secondary output chainring 4 from rotating slower than the crankset shaft 2 when the crankset shaft 2 rotates in the normal pedalling direction. The purpose of this freewheel 16 is that the gear ratio of the power train cannot be less than 1.1. This location of the first freewheel 16 makes it possible, in case of high pedalling torque, to avoid high torque in the rest of the transmission. Thus, certain parts of the power train are not subjected to high torque. It is particularly interesting to preserve the epicyclic gear and the transmission system between the crankset shaft 2 when it includes a deformable transmission element 15, such as a belt, in this way.

FIG. 2 shows a variant of the power train 1 in which a second freewheel 17 is installed between the crankset shaft 2 and the first toothed wheel 13. The function of this freewheel 17 is to prevent the second motor 50 from driving the crankset shaft 2 when the crankset shaft 2 is actuated in the normal pedalling direction.

The second freewheel 17 drives the first toothed wheel 13 when the crankset shaft 2 is actuated in the normal pedalling direction, but the first gear 13 cannot drive the crankset shaft 2 when the crankset shaft 2 is actuated in the normal pedalling direction.

The addition of the second freewheel 17 provides more control flexibility because A allows the second motor 50 to rotate without operating the crankset shaft 2. This makes it possible, for example, to operate the motor with the help of an accelerator without the cyclist operating the crankset.

Figure 3:
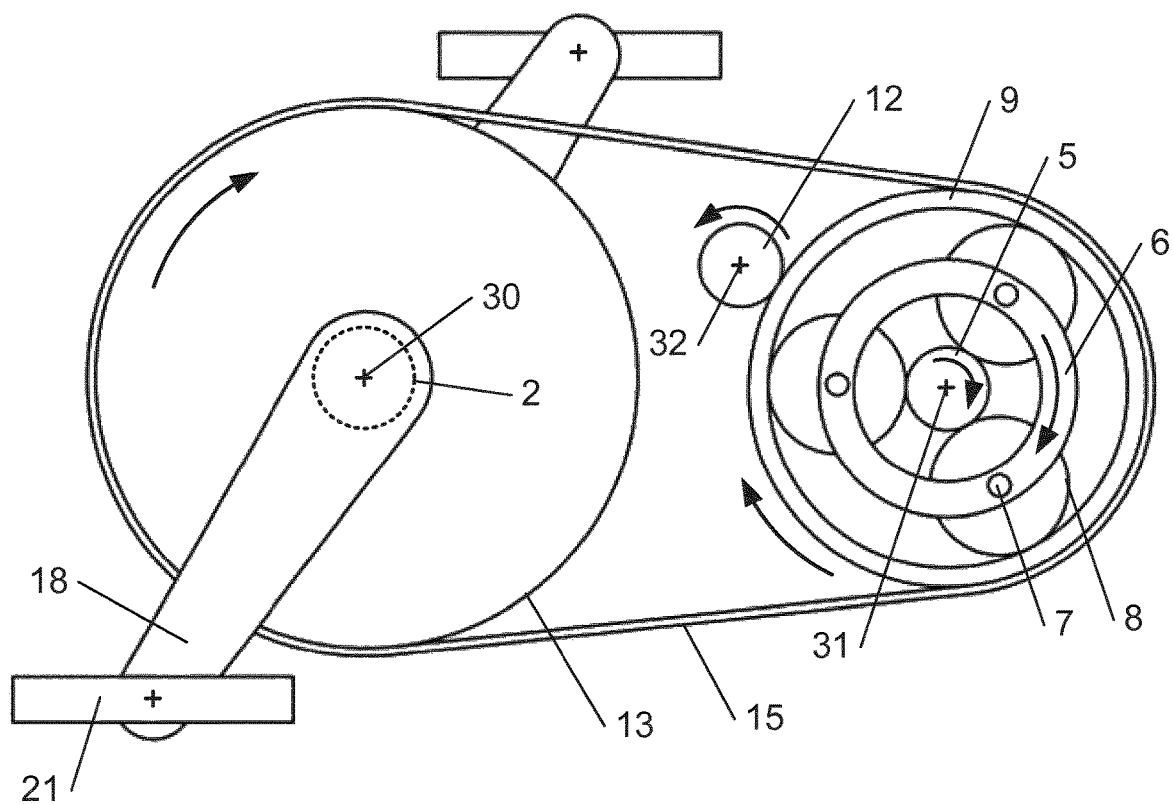
FIG. 3 illustrates very schematically an internal kinematic chain of a power train according to an embodiment of the invention.

FIG. 3 illustrates very schematically an internal kinematic chain of a power train 1 according to an embodiment of the invention. According to this kinematic chain, the cyclist provides input power to the system via pedals 21, driving the crankset shaft 2 via the cranks 18. The first toothed wheel 13, which is integral with the crankset shaft 2, drives, via the deformable transmission element 15, the ring gear 9, so that the latter rotates faster than the crankset shaft 2. The pinion 12, integral with the rotor 57 of the second motor (not shown in this simplified diagram), is connected with a fixed ratio to the ring gear 9. The ring gear 9 is the first input of the epicyclic gear. The sun gear 5, integral with the rotor 47 of the first motor (not shown on this simplified diagram), is the second input of the epicyclic gear. The sun gear 5 and the ring gear 9 are connected together by means of the planet carrier 6 comprising at least one planet gear 3. The planet gear(s) 8 is (are) held, free to rotate, by shafts 7 of the planet carrier 6. The planet carrier 6 is the output of the epicyclic gear.

The arrows in FIG. 3 show the direction of rotation of the individual components during normal operation of the power train 1. For the sake of simplification and visibility of the diagram in FIG. 3, the different transmission components (wheel, pinion, belt) appear smooth and may suggest a frictional transmission. This does not, of course, rule out the use of toothed teeth to make toothed wheels or toothed belts.

FIG. 4 shows a side view of a pedal vehicle with an embodiment of the invention: a power train 1, an output transmission chain 23, a rear wheel Onion 24 and a tensioning roller 22. The output transmission chain 23 comprises an upper strand 23a, a lower strand 23b and an intermediate strand 23c. The intermediate strand 23c is the part of the output transmission chain 23 between the main output chainring 3 and the secondary output chainring 4.

The function of the tensioning roller 22 is to take up the slack in the output transmission chain or belt 23 when the transmission is put under load. It allows the intermediate strand 23c to remain taut. This tensioning roller 22 can be integrated into the power train 1 or attached to the frame of the pedal vehicle. It is positioned so that it is in contact with the lower strand 23b. It is also possible to consider stationary operation without tensioning roller 22.

In normal operation mode of the power train 1, the main output chainring 3 drives the output transmission chain or belt 23. The secondary output chainring 4, being preferably meshed on the same transmission chain 23 as the main output chainring 3, rotates at a higher speed than the crankset shaft 2. The secondary output chainring 4 is disengaged from the crankset shaft 2 by means of the first freewheel 16. A first function of the secondary output chainring 4 is to guide the transmission chain 23 around the shaft of the crankset 2, thereby increasing the distance between the upper chain strand 23a and the lower chain strand 23b. In this way, there is sufficient space for the right rear base of the frame to pass through in case the propulsion system is installed on a bicycle frame. This right rear frame base is a frame tube connecting the rear wheel attachment point to a power train mounting bracket. It is not shown in FIG. 4.

In some special operating modes, different from the normal operating mode of the power train 1, the first freewheel 16 locks and prevents the secondary output chainring 4 from rotating slower than the shaft of the crankset 2. In this case, the secondary output chainring 4 drives, in whole or in part, the output transmission chain 23, and thus also the main output chainring 3. If the electrical system is switched off and/or the power assistance is deactivated and the lowest gear ratio of the power train 1 is selected (either by the user or by the control system), then all of the cyclist's power is transmitted to transmission chain 23 via the secondary output chainring 4. The rest of the transmission is therefore unloaded and the transmission is mechanically highly efficient.

The secondary output chainring 4 can also transmit part of the power during normal operation of the power train 1, if the instantaneous torque of the cyclist exceeds a certain threshold and the first motor 40 is saturated at its maximum torque. For the duration of this push on the pedal 21, the instantaneous value of the gear ratio of the power train will decrease, and if the programmed gear ratio is low, the first freewheel 16 may activate and drive the secondary output chainring 4 which will transmit the cyclist's excess torque to the transmission chain 23. The interaction of the secondary output chainring 4 and the first freewheel 16 prevents the gear ratio of the power train from reaching a value lower than 1.

Figure 5:
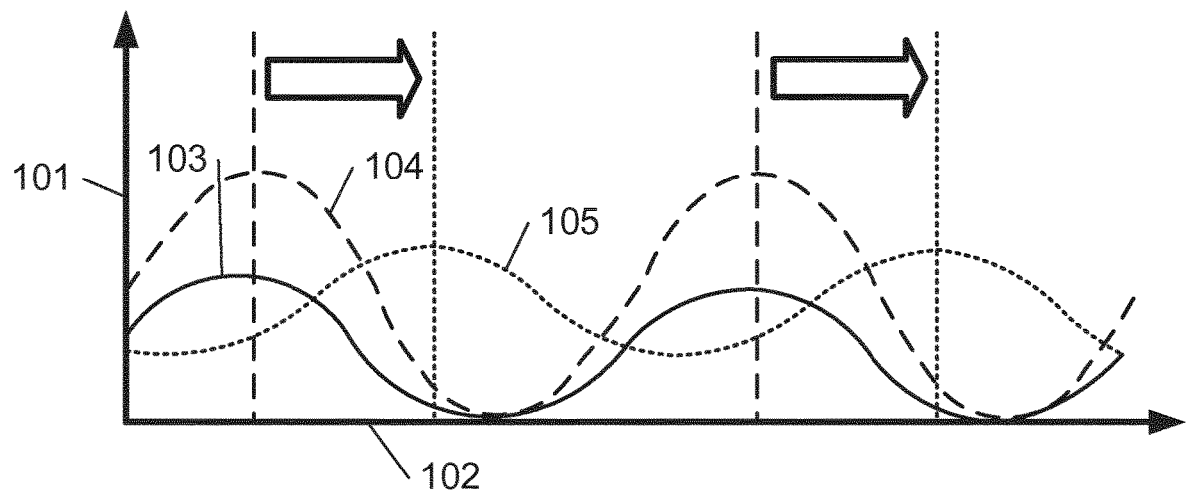

A first method of smoothing the power assist according to the invention is shown in FIG. 5. This first method involves smoothing the torque provided by the two electric motors by shifting in time the thrust given by the second motor. The graph in FIG. 5 illustrates, on a graph of torque 101 versus crankset angle 102, the torque of the user 103, the torque of the first motor 104 and the torque of the second motor 15. The user transmits the force he imposes to the crankset shaft 2 via the cranks 18, which induces a reciprocating torque in the shaft of the crankset 2. The torque provided by the user is maximum when one of the two cranks is close to horizontal. The first motor 40 is preferably regulated to operate at a certain rotational speed which is proportional to the crankset angle velocity of the crankset 40. When the user exerts a thrust on one of the two cranks 18, the crankset accelerates causing a delay in the angular position of the first motor 40. The latter corrects this delay by increasing its torque. The torque provided by the cyclist and the torque provided by the first motor 40 are therefore relatively in phase.

The invention proposes to phase shift the torque imposed on the second motor 50 in order to fill the torque troughs of the first motor 40 and thus smooth the total torque supplied to the rear wheel. This stabilizes the regulation, improves efficiency, reduces stress in the transmission and allows the size of the first motor 40 to be reduced. To achieve this smoothing method, it is possible, for example, to shift or filter the current signal measured on the first motor 40 according to the angular position of the crankset, resulting in a shift of the torque imposed on the second motor 50.

Figure 6:
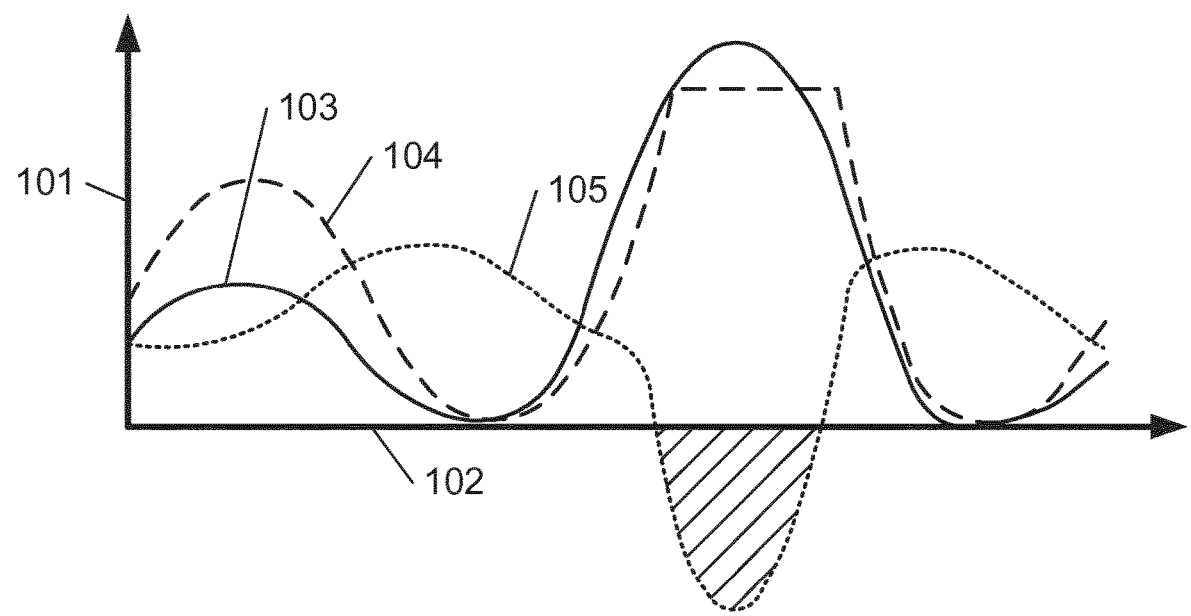

FIG. 6 schematizes a method of transmission slip prevention which can be applied to the power train according to the invention. The graph in FIG. 6 illustrates, on a graph of torque 101 versus crankset angle 102, the torque of the user 103, the torque of the first motor 104 and the torque of the second motor 15. The human is capable of providing high values of torque in the crankset for short periods of time and at low pedalling speeds. Since the torque applied to the crankset is transmitted directly in opposition to the first motor 40 (via the torque law of the epicyclic gear), this implies that the first motor 40 must quickly deliver a lot of torque and therefore consume a lot of current in order to follow its position setpoint. In order to limit energy consumption and to protect the windings of the first motor 40 as well as the gears, the invention proposes to limit the maximum torque delivered by the said first motor 40. The disadvantage of this limitation is that the first motor 40 will no longer be able to suitably follow its position servo setpoint when it is saturated at its maximum torque (current limitation), which will produce a slipping sensation during which the cyclist will feel his gear ratio drop during the short moment of the excess pedal thrust. Thus, the power train is arranged so that the current or torque setpoint of the second motor 50 is applied with a delay so that the assistance peaks of the second motor 50 are in phase with the torque troughs of the first motor 40.

The anti-slip method proposed by the present invention comprises using the second motor 50 as a generator to brake the movement of the cyclist when the latter inflicts too great thrusts on the pedals. The actual level of electrical assistance will decrease during this excessive thrust, but the first motor 40 will be able to follow its angular position setpoint and thus to follow the setpoint gear ratio. FIG. 6 illustrates a situation where the torque provided by the user increases rapidly and rises to a high value. The method according to the invention decreases the setpoint current (and thus the torque) of the second motor 50 and even imposes a negative current (negative torque) for a moment, to allow the first motor 40 to follow its angular position setpoint as well as possible and without providing excessive torque. During the period of time when the second motor 50 is braking the crankset, the current supplied by the second motor 50 can either power the battery or be supplied to the first motor 40. This regeneration area is hatched in FIG. 6. Thus, the power train is arranged so that the current or torque setpoint of the second motor 50 is lowered to negative current or torque values when the first motor 40 can no longer follow its angular position setpoint.

It is interesting to note that the arrangement of the power train according to the invention is compatible with the power train variants described in the document WO2013/160477 or in the document WO2016/034574 or with other known power train variants.

In other words, the invention relates to a power train 1 for a pedal vehicle. The power train 1 comprises a main output chainring 3 and a secondary output chainring 4 coupled to the crankset shaft 2 by a first freewheel 16. The coupling between the crankset shaft 2 and the main output chainring 3 is via a deformable transmission element 15 and an epicyclic gear.

The present invention has been described in relation to specific embodiments, which are purely illustrative and should not be considered as limiting. In general, the present invention is not limited to the examples illustrated and/or described above. The use of the verbs "consist", "include", "comprise", or any other variant, as well as their conjugations, can in no way exclude the presence of elements other than those mentioned. The use of the indefinite article "an", or the definite article "the", to introduce an element does not exclude the presence of a plurality of such elements. The reference numbers in claims shall not limit their scope.

The invention claimed is:

1. A power train for a pedal vehicle, comprising:
   a crankset shaft arranged to rotate about a first axis of rotation;
   a main output chainring arranged to drive an output transmission chain or belt;
   a first motor;
   a second motor; and
   an epicyclic gear comprising a first input element, an output element and a sun gear,
   the crankset shaft and the second motor being connected to the epicyclic gear via the first input element so as to form a first input of the epicyclic gear;
   the first motor being connected to the epicyclic gear via the sun gear so as to form a second input of the epicyclic gear,
   the output element connecting the epicyclic gear to the main output chainring so as to form an output of the epicyclic gear,
   wherein
      the main output chainring, the first input element, the output element and the sun gear are arranged to rotate about the same second axis of rotation different from the first axis of rotation,
      the main output chainring is integral with the output element, and
      the power train comprises:
   a secondary output chainring arranged to rotate about the first axis of rotation and meshed with the output transmission chain or belt;
   a first freewheel arranged to prevent the secondary output chainring from rotating slower than the crankset shaft when the crankset shaft rotates in the normal pedalling direction; and
   a speed gear reduction system maintaining the direction of rotation for transmitting a rotation between the crankset shaft and the first input element.

2. The power train according to claim 1, wherein the first input element is a ring gear and the output element is a planet carrier of the epicyclic gear.

3. The power train according to claim 1, wherein the first input element is a planet carrier of the epicyclic gear and the output element is a ring gear of the epicyclic gear.

4. The power train according to claim 1, wherein the speed gear reduction system maintaining the direction of rotation comprises a deformable transmission element.

5. The power train according to claim 1, wherein the second motor is connected to the first input element of the epicyclic gear by a single-stage reduction mechanism.

6. The power train according to claim 1, wherein the first motor is integral with the sun gear.

7. The power train according to claim 1, wherein the first motor and the second motor are located on the same side of the epicyclic gear.

8. The power train according to claim 1, further comprising:

an angular position measuring element of the first motor;
an angular position measuring element of the second motor;
a current measuring element of the first motor;
a current measuring element of the second motor; and
a control unit connected to the first motor, the second motor, and programmed to control the first motor and the second motor according to the angular position of the first motor, the angular position of the second motor, the current of the first motor and the current of the second motor, the control unit being programmed to control the second motor according to a current or torque control and to control the first motor according to an angular position or angular velocity control.

9. The power train according to claim 8, wherein the control unit is programmed to further rely on a gear ratio parameter to control the first motor.

10. The power train according to claim 9, wherein the control unit is programmed to determine a rotational speed setpoint and to impose said rotational speed setpoint on the first motor, the rotational speed setpoint being determined as directly proportional to a rotational speed of the second motor obtained by the angular position measuring element of the second motor and to the gear ratio parameter.

11. The power train according to claim 8, wherein the control unit controls the second motor according to a gear ratio parameter and an assist level parameter of the power train.

12. The power train according to claim 11, wherein the control unit is programmed to determine a current or torque setpoint and to impose said current or torque setpoint on the second motor, the current or torque setpoint being determined as directly proportional to a torque or current of the first motor obtained by the current measuring element of the first motor and being dependent on the power train gear ratio parameter and the assist level parameter of the power train.

13. The power train according to claim 1, wherein the crankset shaft and the first input element are connected so that the first input element rotates faster than the crankset shaft.

14. The power train according to claim 1, wherein the main output chainring has a smaller diameter than the secondary output chainring.

15. The power train according to claim 1, wherein the second motor is connected to the first input element so that the first input element rotates slower than the rotor of the second motor.

16. The power train according to claim 1, further comprising a second freewheel arranged to prevent the second motor from driving the crankset shaft in a rotational direction corresponding to a forward movement of the pedal vehicle.

17. The pedal vehicle comprising the power train (1) according to claim 1, a wheel, and the output transmission chain or belt meshed with the main output chainring, the secondary output chainring and a pinion of the wheel.

\* \* \* \* \*